United States Patent
Forsmo

[19]

[11] Patent Number: 5,819,075
[45] Date of Patent: Oct. 6, 1998

[54] MULTIPROCESSOR INTERCONNECTION IN SCALABLE COHERENT INTERFACE

[75] Inventor: Steinar Forsmo, Oslo, Norway

[73] Assignee: Dolphin Interconnect Solutions, Inc., West Lake Village, Calif.

[21] Appl. No.: 502,687

[22] Filed: Jul. 14, 1995

[51] Int. Cl.[6] .................................. G06F 1/04; G06F 1/12
[52] U.S. Cl. ........................ 395/552; 395/558; 395/559
[58] Field of Search ..................................... 395/551, 552, 395/553, 558, 559, 250; 364/229, 239, 240, 240.2, 270, 270.7

[56] References Cited

U.S. PATENT DOCUMENTS

| 5,428,649 | 6/1995 | Cecchi ...................................... 375/372 |
| 5,487,092 | 1/1996 | Finney et al. ............................ 375/354 |
| 5,560,027 | 9/1996 | Watson et al. ........................... 395/800 |

Primary Examiner—Dennis M. Butler
Attorney, Agent, or Firm—Keith A. Cushing

[57] ABSTRACT

A scalable coherent interface (SCI) architecture delivers a high speed unidirectional signal from one SCI node to a next successive SCI node. The signal includes a data portion, e.g., SCI symbol, and a clock portion, e.g., a symbol separator. The clock portion indicates when the data portion may be sampled when collecting a sequence of SCI symbols. Relative timing between bits of the data portion and between the data portion as a whole and the symbol separator clock becomes skewed during transmission. The receiving node introduces delay in the clock portion as a function of detected stability in a synchronizing packet. A plurality of data registers are cyclicly written in response to the delayed clock portion whereby a single one of said registers at a given time is concurrently clocked and enabled. A control device monitors enable signals applied to the registers and in coordinated fashion cyclically reads SCI symbols therefrom. As a result, signal transmission from a transmitting time domain to a receiving time domain includes a time domain mapping and de-skewing function.

14 Claims, 7 Drawing Sheets

MULTIPROCESSOR INTERCONNECTION IN SCALABLE COHERENT INTERFACE

FIELD OF THE INVENTION

The present invention relates generally to computing devices and interconnection therebetween, and more particularly to methods and apparatus for interconnecting components of a multiprocessor architecture.

BACKGROUND OF THE INVENTION

A multiprocessor architecture entails the interconnection of a number of components, e.g., processing and memory elements, and executes collaborative programming in a coordinated fashion to achieve greater processing speed or ability relative to a single processor architecture. A scalable multiprocessor architecture accepts additional processors with resulting increased processing speed or ability, but without significant alteration to multiprocessor compliant operating system software executing in the scalable multiprocessor architecture. Well established software exists for such architectures. Any proposed scalable multiprocessor architecture should execute existing applications software without any, or any significant, software modification.

The traditional mechanism interconnecting components of a multiprocessor architecture is the conventional computer bus. A conventional computer bus allows mounting of various components, e.g., processors, memory components, and input/output (I/O) devices, on a set of tapped transmission lines whereby data, control, system status, and clock signals are available to each component on the bus and establish a bus protocol.

Heretofore, maximum processing speed, such as dictated by the processor clock speed or processor instructions executed per second (MIPS), in relation to the conventional bus bandwidth allowed incorporation of multiple processor components on an expensive proprietary common bus without bus bandwidth limiting overall system performance. Unfortunately, as processor performance increases and as the ability to incrementally incorporate additional processors into a multiprocessor architecture becomes an industry standard, the traditional computer bus presents a bottle neck in overall system performance.

Conventional bus architectures allow only a limited number of components on a single bus. As processor performance characteristics increase, so do bus performance requirements. Unfortunately, faster bus performance requires a physically shorter bus is required and, therefore, presents a constraint on the number of processors allowed on a single bus.

The industry requires, however, scalability, i.e., an ability to simply add processors to increase performance in a multiprocessor architecture. Fundamental limitations of computer busses, including physical limitations inherent to tapped transmission lines and including the fundamental limitation that only one device can transmit at one time on a bus, frustrate if not make impossible the industry desire to economically incorporate scalability in multiprocessor architectures.

A solution to the challenge of scalability in a multiprocessor architecture should include a shared coherent memory feature. Existing multiprocessor software assumes processors have access to a shared coherent cache memory resource. Accordingly, any implementation must, to make use of such existing capability, conform to a shared coherent cache memory feature, dynamically and global in nature as additional processor resources are included. Coherent memory requires, however, significant additional bus activity when verifying data validity among coherent cache memory devices.

Given these limitations, the ability to scale processors on a single bus is not likely to be achieved. Some proprietary architectures have taken the approach of employing multiple busses, each bus carrying a limited number of high speed processors, with an interface block attached to each bus to provide coupling among the body of processors while also maintaining shared memory and cache coherence. However, because such architectures are proprietary and dedicated to specific applications, such architectures may not fully implement shared memory or cache coherence as a general solution to a scalable multiprocessor architecture.

A recent proposal for scalable coherent memory multiprocessor architectures establishes processor clusters on individual busses and couples the processor clusters. Additional processors join the architecture by connecting additional busses with processor clusters mounted thereon. Each bus holds a limited number of components, e.g., two to four processors and a memory resource, on a physically short, high performance bus. The busses interconnect through a scalable coherent interface (SCI) in, for example, a ring network architecture. The SCI coupling among individual busses may establish, however, a variety of architectures, e.g., switch architectures including star or multi-ring arrangements.

SCI provides an easy to implement, scalable, and cost-effective system interconnect with computer-bus-like services meeting high performance requirements needed to interconnect high speed, e.g., RISC-based server and work station, devices and device clusters.

SCI technology is embodied in the ANSI/IEEE Standard 1596–1992 SCI, the disclosure of which is incorporated herein fully by reference thereto. The subject matter of the present invention operates in conjunction with the SCI standard, and the disclosure herein assumes familiarity with the SCI standard.

Interconnection of SCI nodes via an SCI interconnect is by unidirectional, high-speed communication. The SCI standard recognizes that a variety of communication mechanisms may be employed to implement a high-speed, unidirectional transmission from one SCI node to an adjacent SCI node. Critical to SCI performance, however, is extremely high-speed communication. In such high-speed environments, relative timing between signals provided by a transmitting SCI node must be considered when viewed from the perspective of the receiving SCI node. More particularly, certain unpredictable skew in relative timing as viewed by the receiving SCI node must be considered when interpreting the high-speed SCI communication protocol at the receiving SCI node.

Generally, SCI protocol provides a sequence of SCI symbols and an associated symbol separator clock. Each transition, i.e., positive-going and negative-going, in the symbol separator clock indicates presentation of a next SCI symbol. Production of the SCI symbol separator clock and sequence of SCI symbols at the transmitting device occurs with negligible skew and with reference to a transmitting node clock domain. Unfortunately, signals undergo certain relative timing skew when transmitted along the SCI interconnect, and the receiving device must interpret these signals in light of relative timing skew and with reference to its clock domain. The receiving SCI device must map the incoming symbol stream to its local clock domain while taking into account timing skew.

Thus, SCI represents a general and standardized solution to the problem of providing scalability in a shared coherent cache memory multiprocessor architecture while allowing addition of multiple processors to add processing power to the configuration and maintain the desirable characteristics of shared coherent cache memory resources. The SCI standard requires, however, high speed unidirectional communication from an upstream node operating under its local clock domain to a downstream node operating under its local clock domain. Physically delivering signals from one SCI node to the successive SCI node introduces relative timing skew among the signals, and the treatment of incoming signals at the receiving SCI node must account for such timing skew in the high-speed communication environment of the SCI protocol.

The subject matter of the present invention addresses such relative timing skew in signals presented to a receiving SCI node.

SUMMARY OF THE INVENTION

The present invention operates in a system generating at a first device a signal in reference to a first clock domain. The signal includes a data portion, e.g., an SCI symbol, and a clock portion, e.g., an SCI symbol separator clock. A method under the present invention receives the signal at a second device referencing a second clock domain. At the second device, the clock portion is delayed to produce a delayed clock as a function of detected stability in the data portion. First and second sets of a plurality of data registers are clocked alternately with reference to the delayed clock. The registers are organized as an ordered sequence with members of the first and second register sets alternating or interleaved through the sequence. Two adjacent ones of the plurality of registers are enabled at a given time by selectively applying an enable signal thereto. A given one of the registers captures the data portion of the signal, the given register being that register concurrently clocked and enabled. The data portion is received within the second clock domain by then reading the data portion captured at one of the registers following the enabling step applied thereto.

In accordance with one aspect of the present invention, calculating a delay in the clock portion includes the steps of passing the clock portion along a sequence of delay elements with each delay element providing output to a next successive one of the delay elements. Further, each delay element provides its output to a corresponding input of a multiplexor and to a corresponding capture element. The content of each delay element is captured in the corresponding capture element concurrent with detected stabilization in a synchronizing condition of the signal, e.g., on SCI synchronizing symbol. By locating a position of a transition within the sequence of delay elements, an appropriate delay in the clock portion is calculated and applied as a select signal to the multiplexor element whereby the output of the multiplexor element provides the delayed clock.

A device under the present invention receives a signal, the signal including a data portion and a clock portion, and includes a clock receiving buffer and a data receiving buffer. A delay element coupled to the clock receiving buffer generates a delayed clock, the delay being relative to the clock portion as taken from the clock receiving buffer. A clocking element receives the delayed clock and produces as a function thereof first and second register clock signals, the first and second register clock signals being mutually complimentary. A plurality of data registers organized as an ordered sequence, with members of first and second register sets alternating or interleaved through said sequence, receives the first register clock signal at the first register set and the second register clock signal at the second register set. An enable element couples to an enable input of each of the registers and selectively enables at least one of the registers whereby a selected one of said registers is concurrently clocked by said clocking element and enabled by said enable element and in response thereto collects said data portion of said signal.

A device reading a signal under the present invention, the signal including a data portion and a clock portion, includes a data bus carrying said data portion and a plurality of registers each including a data input coupled to said data bus, a clock input, and an enable input. The plurality of registers are organized as an ordered sequence with each of the registers capturing said data portion, e.g., on SCI symbol, in response to concurrent assertion of its clock and enable inputs. First and second mutually complimentary clock signals are applied alternately through the ordered sequence of registers whereby adjacent ones of said plurality of registers each receive only one of said first and second clock signals. An enable signal is applied selectively to two adjacent ones of said plurality of registers at the enable inputs thereof. A read control device monitors the enable signal and captures from a read select one of said registers said data portion following capture thereof at said read select one of said registers.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
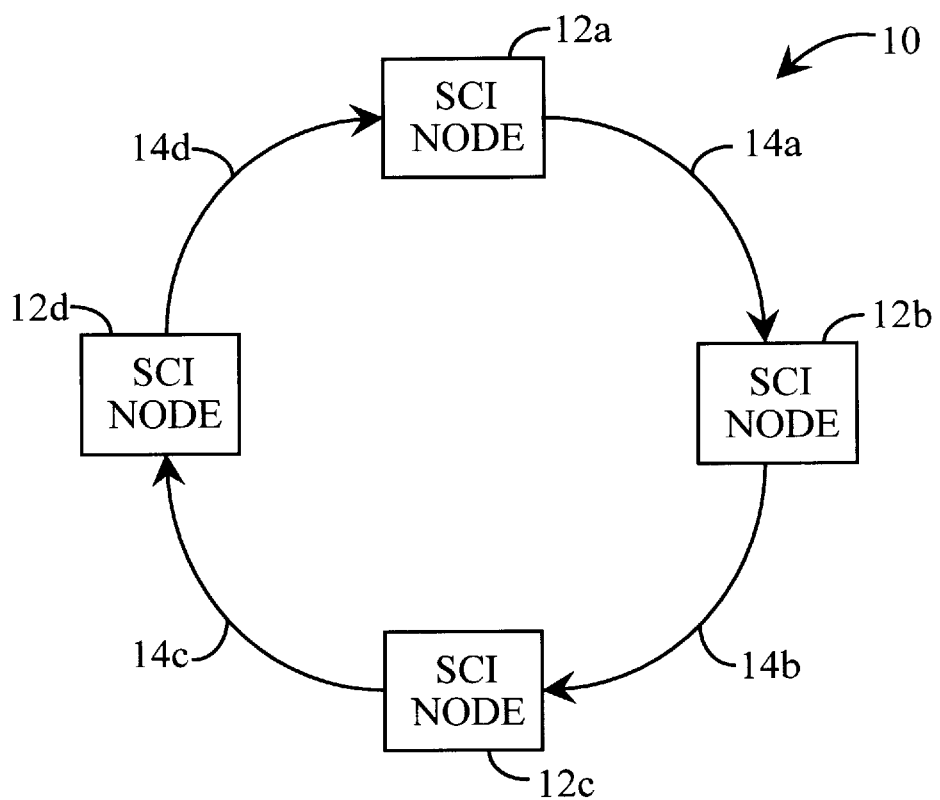
FIG. 1 illustrates generally a scalable coherent interface (SCI) architecture in the form of a ring-node network.
Figure 2:
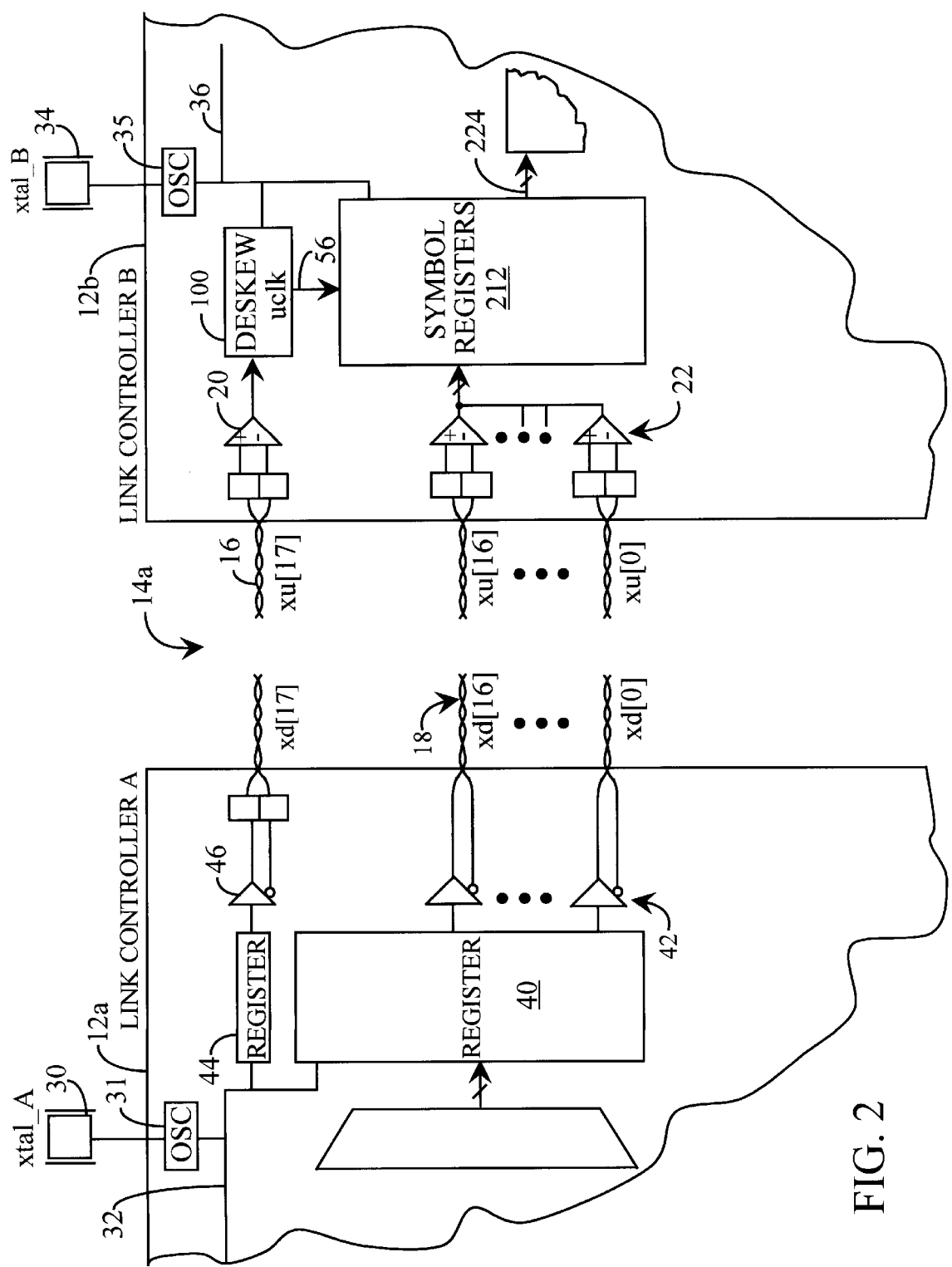
FIG. 2 illustrates in more detail unidirectional communication from one SCI node to a next SCI node in the ring-node network of FIG. 1.

FIG. 1 illustrates generally an SCI ring-node network 10. SCI ring-node network 10 includes SCI nodes 12 and SCI unidirectional interconnects 14. Each SCI node 12 couples to one adjacent SCI node via one of unidirectional SCI interconnects 14. For example, node 12a couples via interconnect 14a to node 12b. Node 12b communicates with SCI node 12c through SCI interconnect 14b, SCI node 12c communicates with SCI node 12d via SCI interconnect 14c, and SCI node 12d communicates with SCI node 12a via SCI interconnect 14d. As may be appreciated, additional, or fewer, SCI nodes 12 may be integrated into architecture 10 to implement scalability. The subject matter of the present invention pertains to a node 12 communication with an adjacent node 12 via the corresponding unidirectional SCI interconnect 14. Accordingly, the disclosure herein applies to a variety of processor architectures beyond a ring-node architecture. FIG. 2 illustrates in more detail communication from one SCI node 12 to an adjacent node 12 via SCI interconnect 14. In particular, FIG. 2 shows the signal transmitting portion of SCI node 12a coupled to the signal receiving portion of SCI node 12b via SCI interconnect 14a. Each of nodes 12a and 12b are shown only partially, the information transmitting circuitry in the case of 12a and the information receiving circuitry in the case of node 12b. It will be understood that communication from node 12a to node 12b represents also interconnection between any two SCI nodes via an SCI interconnect.

Interconnect 14a includes a total of eighteen twisted conductor pairs, i.e., a total of thirty-six conductors, delivering by differential signal eighteen logical signals. As illustrated herein, the twisted pairs comprising interconnect 14a are designated as a single twisted conductor pair 16 carrying a single logical value and as a twisted conductor pairs 18 carrying 17 logical values.

Twisted conductor pairs 18 deliver a sequence of SCI symbols, with each SCI symbol appearing across conductor pairs 18 and including 16 data bits and one flag bit. Twisted pair 16 carries a bi-state symbol separator clock as a differential signal on two conductors. In accordance with SCI protocol, node 12b collects a symbol from twisted conductor pairs 18 in response to each transition in the symbol separator clock taken from twisted pair 16. Node 12a reliably delivers SCI symbols on twisted conductor pairs 18 in appropriate timed relation to the symbol separator clock, i.e., with virtually no relative skew as produced. Relative timing between the symbol separator clock and SCI symbols as viewed by node 12b, however, becomes skewed in the high-speed environment of the SCI protocol. The subject matter of the present invention addresses such skewing among the data bits of each SCI symbol as well as relative skewing between each SCI symbol as a whole and the symbol separator.

Node 12a includes a crystal 30 and oscillator 31 producing a local clock 32. Node 12b includes a crystal 34 and oscillator 35 producing a local clock 36. Node 12a circuitry operates within the domain of clock 32 while node 12b circuitry operates within the domain of clock 36. Clocks 32 and 36 are highly precise, but not necessarily in synchronization. Delivering information, i.e., delivering a symbol separator clock and corresponding sequence of SCI symbols, requires conversion or mapping from the domain of local clock to the domain of local clock 36.

Node 12a includes a 17 bit register 40 holding an SCI symbol and associated flag bit for transmission via 17 differential amplifiers 42 which in turn drive the twisted conductor pairs 18. Node 12a further includes a single bit register 44 responding to local clock 32 and driving a differential amplifier 46 which in turn drives twisted conductor pair 16 as the symbol separator clock. Operation of registers 40 and 44 and differential amplifiers 42 and 46 in the domain of clock 32 reliably produces appropriate relative timing between the symbol separator clock and sequence of SCI symbols.

Node 12b includes a differential amplifier 20 receiving the symbol separator clock on twisted conductor pair 16 and includes 17 differential amplifiers 22 receiving each SCI symbol and associated flag bit. Differential amplifiers 22 are applied to symbol registers indicated generally as register 212 in FIG. 2. Differential amplifier 20 applies the symbol separator clock to a de-skew control block 100 which in turn delivers a skew-compensated symbol separator clock 56 to symbol register 212. As described more fully hereafter, de-skew control block 100 appropriately times presentation of the skew-compensated clock 56 to clock registers 212 and thereby faithfully capture each SCI symbol at a time when all bits in each SCI symbol are stable.

Figure 3A:
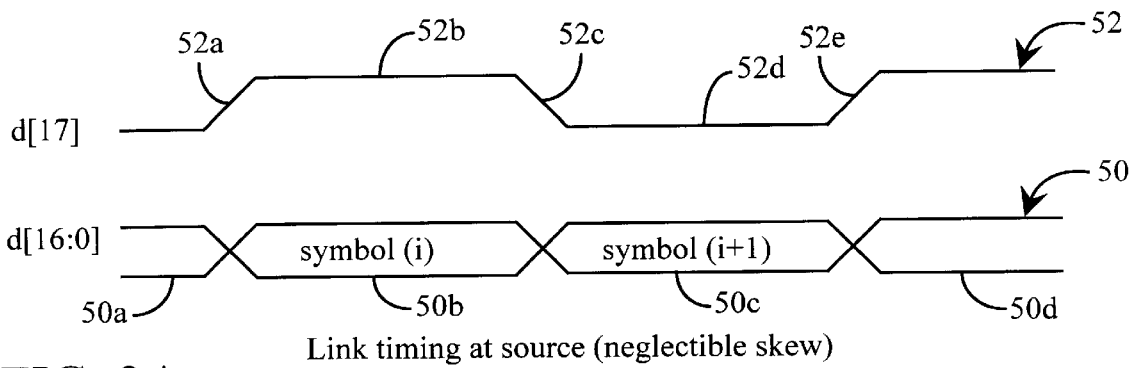
FIG. 3A illustrates relative timing, at a transmitting SCI node, between a symbol separator clock and a sequence of SCI symbols.

FIG. 3A illustrates relative timing from the perspective of the transmitting node, i.e., as viewed by node 12a. In FIG. 3A, the symbol separator clock 52 makes alternating positive-going and negative-going transitions, i.e., transitions 52a, 52c, and 52e. During the intervening one-half clock cycles, e.g., half cycle 52b and half cycle 52d, a sequence of SCI symbols 50 are presented on twisted conductor pairs 18, i.e., symbol 50a terminating concurrent with positive-going transition 52a, symbol 50b present during half cycle 52b, symbol 50c present during half cycle 52d, and symbol 50d beginning presentation with the positive-going transition 52e in symbol separator clock 52. Relative timing between the presentation of SCI symbols 50 and symbol separator clock 52 from the perspective of transmitting node 12a is with negligible skew. FIG. 3A represents, therefore, ideal timing between the presentation of symbols 50 and the associated symbol separator clock 52. Unfortunately, such relative timing cannot be preserved following transmission when viewed from the perspective of the receiving SCI node 12b.

Figure 3B:
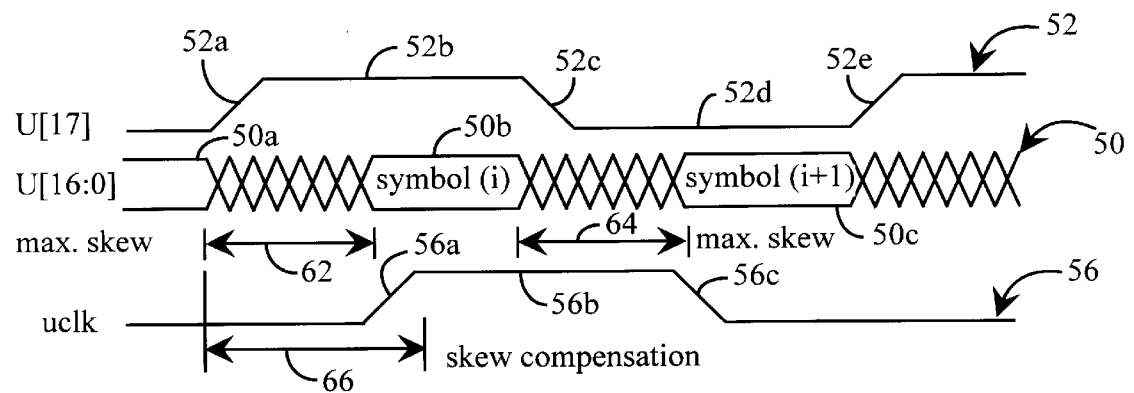
FIGS. 3B and 3C illustrate relative skew, at an SCI receiving node, between the symbol separator clock and a sequence of SCI symbols, and further a skew-compensated symbol separator clock in accordance with the present invention.
Figure 3C:
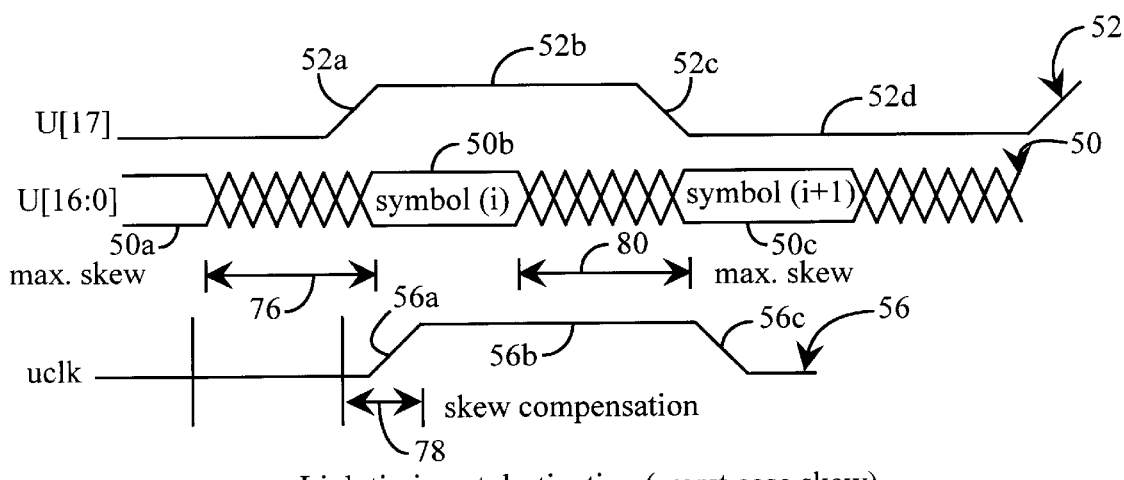

FIGS. 3B and 3C illustrate two extreme worst case skew conditions as viewed from the perspective of receiving node 12b, i.e., relative skew among bits within each symbol and relative to the corresponding symbol separator clock 52. In FIG. 3B, clock 52 makes alternating positive-going and negative-going transitions 52a, 52c, and 52e with intervening half cycles 52b and 52d. Symbols 50 are skewed, and therefore unstable, at each transition 52a and 52c. More particularly, a skew interval 62 between symbol 50a and symbol 50b represents instability of data bits in symbol 50b in relation to positive-going transition 52a in clock 52. Accordingly, if node 12b simply samples symbol 50b in response to positive-going transition 52a, invalid symbol data results. Similarly, symbol 50c is delayed significantly, i.e., by a skew interval 64, relative to the negative-going transition 52c in clock 52. As discussed more fully hereafter, a skew-compensated compensated symbol separator clock 56 is located more appropriately relative to symbols 50b and 50c whereby positive-going transition 56a provides an appropriate condition for sampling symbol 50b and negative-going transition 56c provides a basis for sampling symbol 50c. Symbol separator clock 56 is shifted by a skew compensation delay 66 as a function of the content or stability of incoming symbols 50 whereby each transition in symbol separator clock 56 corresponds to presentation of a valid symbol 50.

Figure 4A:
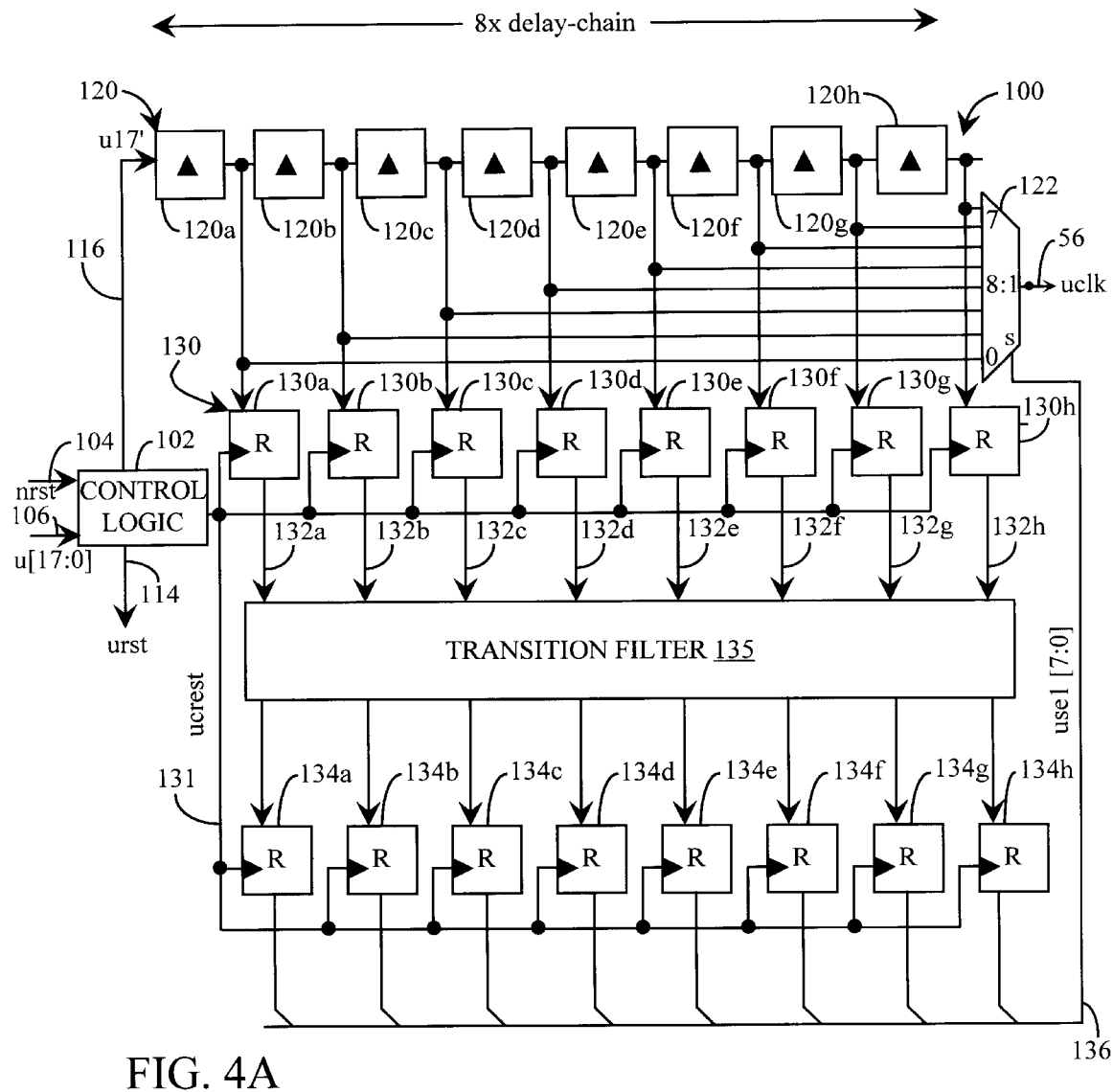
FIGS. 4A and 4B illustrate circuitry at an SCI receiving node including production of a skew-compensated symbol separator clock as a function of detected stability in a sequence of SCI symbols

FIG. 3C illustrates the other extreme worst case skew condition where each symbol 50 arrives just slightly after a transition in the symbol separator clock 52. More particularly, positive-going transition 52a is followed by symbol separator clock 52 half cycle 52b. Symbol 50b becomes stable just slightly after positive-going transition 52a. Thus, positive-going transition 52a in symbol separator clock 52 cannot be used directly as a basis for capturing symbol 50b. Skew compensated symbol separator clock 56 is delayed by a skew compensation interval 78 to insure that transitions therein coincide with stable data for symbols 50. More particularly, upon occurrence of the positive-going transition 56a, delayed relative to transition 52a by the skew compensation interval 78, provides basis for capturing symbol 50b, i.e., occurs when all data bits in symbol 50b are valid. Similarly, negative-going transition 56c provides valid basis for capturing the next symbol 50c. FIG. 4A illustrates de-skew control circuit 100 coupled to a data bus 106, carrying both the symbol separator clock 52 and the symbols 50, and producing the skew-compensated clock 56. Generally, de-skew control circuit 100 adjusts the position of symbol separator clock 56 as a function of the content or stability of symbol 50 data. Transitions in symbol separator clock 56 provide valid basis for capturing symbols 50, i.e., transitions in clock 56 correspond to stable symbol 50 data.

Operation of circuit 100 includes an initialization procedure establishing a skew compensation interval, i.e., a delay in skew compensated symbol separator clock 56 relative to symbol separator clock 52 as taken from data bus 106. Following initialization, presentation of symbol separator clock 56 occurs at the calculated delay as established in the initialization procedure.

A control logic block 102 receives a node reset signal 104 and couples to the data bus 106. Logic block 102 produces a fixed delay intermediate symbol separator clock 116. The symbol separator clock 52 as taken from data bus 106 is delayed by a fixed interval and presented as the intermediate symbol separator clock 116. The fixed delay introduced by block 102 in the intermediate symbol separator clock 116 relative to the symbol separator clock 52 accounts for the delay introduced in delivery of the clock signal via multiplexor 122. Clock 116 enters a delay chain 120, including individual delay elements 120a–120g. Each delay element of chain 120 provides its output to the next successive delay element, and also to a corresponding one of single bit registers 130. For example, delay element 120a provides its output to the next successive delay element 120b and also to the register 130a. Thus, as a transition in clock 116 moves along delay chain 120, it's position is captured in the registers 130. Each delay element 120 also provides its output to corresponding inputs of multiplexor 122. A given skew compensation is established by selecting one of the inputs to multiplexor 122 as the skew-compensated clock 56. By maintaining select signal 136 against the select input of multiplexor 122, circuit 100 maintains a constant skew compensation in clock 56 relative to symbol separator clock 52 as taken from data bus 106.

Initialization of circuit 100 occurs in response to presentation SCI synchronization packets. A synchronization packet includes synchronization symbols. A series of synchronization symbols is detected by block 102 and indicated as state changes in the crest signal 131. Assertion of crest signal 131 by block 102 corresponds to transition of all bits from logic value zero to logic value one. Ideally, such transition occurs simultaneously, but due to skew in delivering information from node 12a to node 12b such transition does not occur simultaneously. Thus, presentation of a stable synchronization packet, including transition of all bits in a symbol from value zero to value one, triggers an assertion of the crest signal 131. Each of registers 130 respond to crest signal 131 by capturing the current output from its corresponding delay element 120. In this manner, the content of the delay chain 120 is captured in registers 130.

Each register 130 provides a corresponding output 132 to a transition filter 135. Transition filter 135 identifies the location of a transition traveling in delay chain 120 at the time of crest signal 131 assertion. Filter 135 then calculates a multiplexor 122 select control signal 136. More particularly, when registers 130 are clocked by crest signal 131, transition filter 135 receives corresponding outputs 132 as a sequence of first logic values followed by a sequence of complimentary logic values. Transition along this sequence from one logic value to the other logic value in the outputs 132 represents a position of a clock 116 transition traveling through delay chain 120. Transition filter 135 provides as output to registers 134 a multiplexor 122 select value 136. For a given skew compensation calculation, one of registers 134 holds a logic value one, while the remaining registers hold a logic value zero. In this manner, the output of registers 134 applies as the select signal 136 to multiplexor 122.

While illustrated in FIG. 4A as an eight bit decoded value, it will be understood that select signal 136 may be provided as an encoded three bit number for application to multiplexor 122. As illustrated, however, select signal 136 contains a single logic value one bit, and the position of that single logic one value bit within the eight bit signal 136 represents the position of a transition within delay chain 120 at the time of crest signal 131 assertion.

Figure 4B:
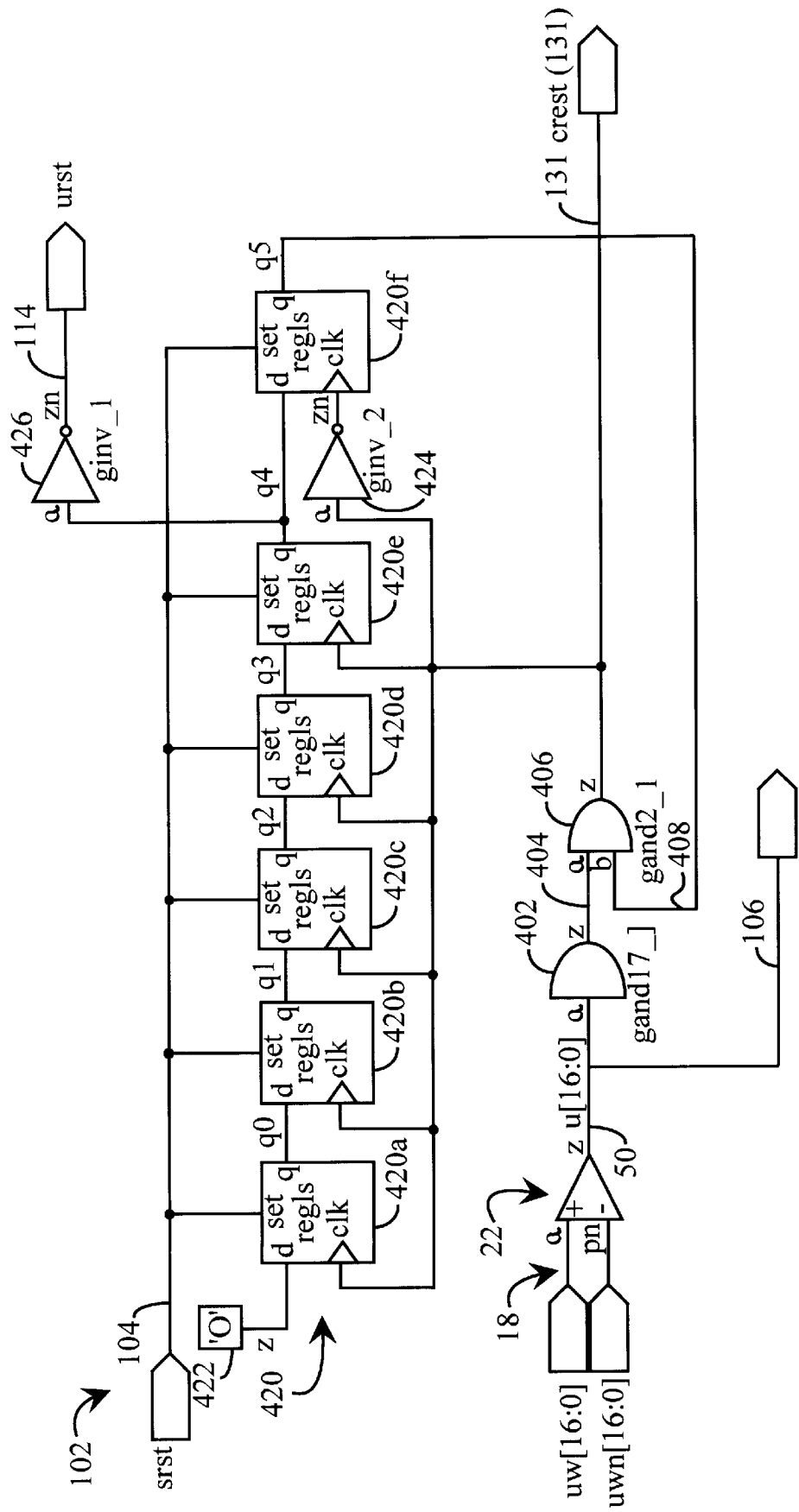

FIG. 4B illustrates in more detail generation of the crest signal 131 in response to the content of an incoming SCI symbol. In FIG. 4B, control logic block 102 receives from upstream differential amplifiers 22 (only one shown in FIG. 4B) an incoming SCI symbol 50. More particularly, each of twisted conductor pairs 18 applies to a corresponding one of differential amplifiers 22 to produce an SCI symbol 50 comprising 16 symbol data bits and one symbol flag bit. The 17 bits of each symbol 50 apply to a seventeen-input AND function 402. Thus, the output 404 of AND function 402 carries a logic one when all bits of a symbol 50 carry a logic value one. The output of differential amplifiers 22 also applies to the bus 106 for delivery of each symbol 50 to symbol registers 212 as explained more fully hereafter.

A two-input AND function 406 receives as its first input the output 404 from AND function 402 and receives as its second input a gate signal 408. The output of AND function 406 is crest signal 131. Thus, crest signal 131 achieves a logic value one when all bits in symbol 50 have logic value one and gate signal 408 carries a logic value one.

Gate signal 408 originates from a series of six one-bit registers 420, individually 420a–420f. Each of registers 420 includes a D input, a SET input, a clock input, and a Q output. The Q output of each register 420 applies to the D input of the next successive register 420. The D input of the first register 420, i.e., register 420a, receives a constant logic zero value 422. The Q output of the final register 420, i.e., register 420f, is the gate signal 408 applied to AND function 406. The reset signal 104 applies in parallel to all SET inputs of registers 420. Thus, upon assertion of the reset signal 104 each of registers 420 carries a logic value one. The clock inputs for each of registers 420a–420e receive the crest signal 131. The clock input of the final register 420f receives an inverted form of crest signal 131 by way of invertor buffer 424. Signal 114 is taken from the Q output of register 420e, by way of an inverting buffer 426.

The crest signal 131 operates in response to an SCI synchronization packet received from the upstream link, i.e., by way of twisted conductors pair 18 and differential amplifiers 22. As dictated by the IEEE-standard for SCI, synchronization corresponds to all data bits in the symbol stream going from logic zero to logic one. The format of the synchronization packet is such that the assertion of crest signal 131 generates a 0-1-0 pulse applied as a clock to the de-skew function. The upstream differential amplifiers 22 produce local representation of each symbol 50. By "and-ing" this symbol 50, i.e., by application to AND function 402, the crest signal 131 results. Assertion of the reset signal 104 forces a logic one into each of registers 420. As each successive synchronization symbol arrives, the crest signal 131 turns off a next successive one of registers 420, i.e., the crest signal 131 clocks registers 420 and the constant zero value 422 moves forward along the series of registers 420. Eventually, register 420f is turned off, i.e., receives a logic value 0 from the preceding register 420e. When register 420f receives a logic value 0, then six synchronization symbols have been presented to control block 102 and six crest signal 131 clock-pulses have occurred. Crest signal 131 then remains off until the reset signal 104 is again asserted. Registers 130 and 134 (FIG. 4A) both receive six clock pulses in the crest signal 131. This guarantees that when the crest signal 131 is finally turned off, data produced by filter 135 is stable on the output of register 134.

While illustrated herein as being responsive to each and every synchronization packet presented in calculating a skew compensation, i.e., calculating a select input 136 to a multiplexor 122, it will be understood that such calculation may be conducted on a more limited basis. More particularly, in actual implementation of the illustrated circuitry, it has been found acceptable to establish a skew compensation delay, i.e., calculate a value for select input 136, based on, for example, six synchronization packets and then lock the value of select input 136. Skew compensation, once calculated in a given architecture, generally remains stable and need not be recalculated for each and every synchronization packet presented to SCI node 12b.

Figure 5A:
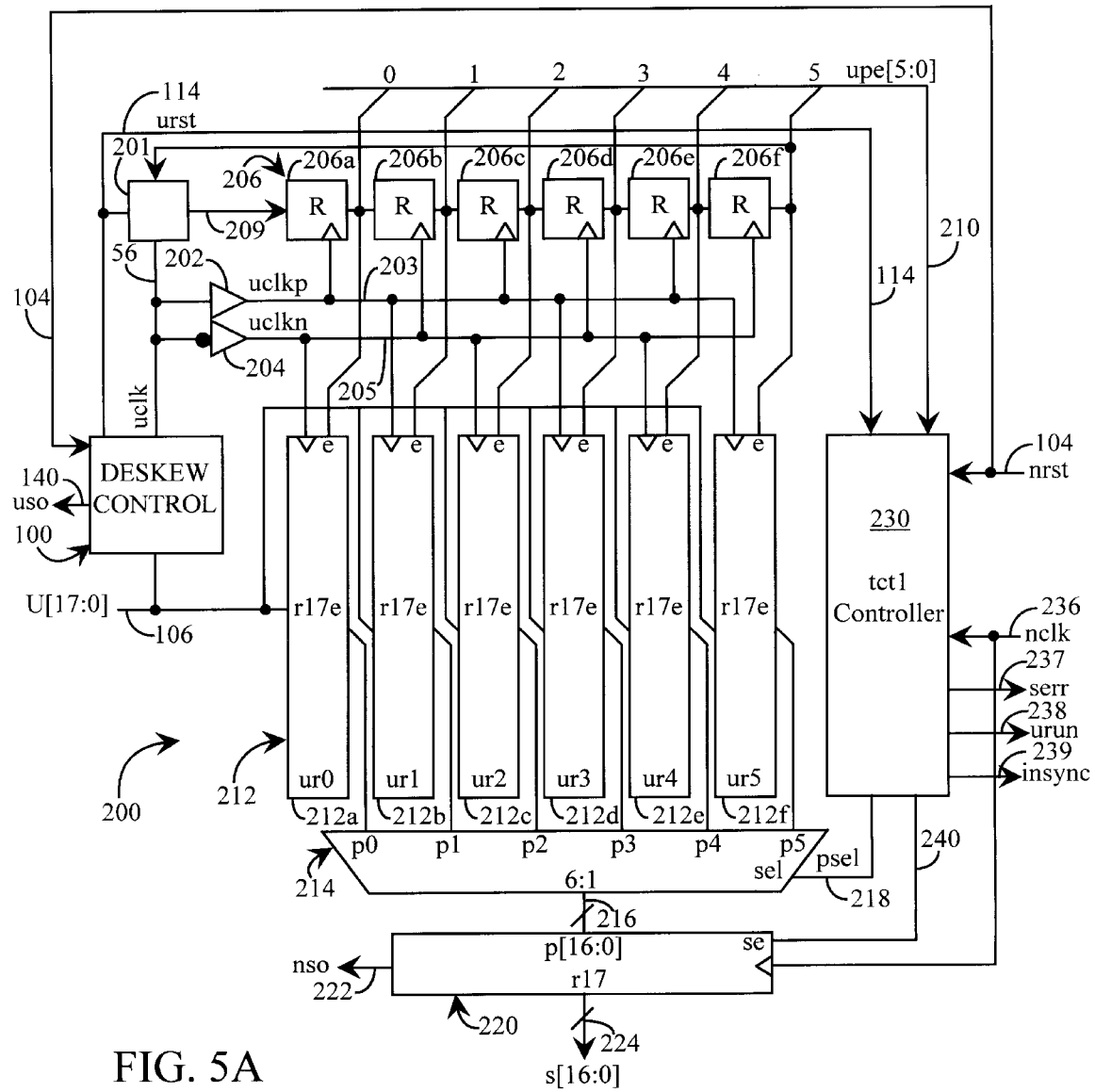
FIGS. 5A and 5B illustrate the skew compensation circuit of FIGS. 4A and 4B as operating in the context of a cyclic read/write elasticity buffer of an SCI receiving node.

FIG. 5A illustrates de-skew control block 100 as described herein above coupled to data bus 106 and producing the skew-compensated symbol separator clock 56. In FIG. 5A, symbol separator clock 56 as provided by de-skew control block 100 applies to a logic block 201 and to buffers 202 and 204. Buffer 202 inverts clock 56 as the UCLKP clock 203 and buffer 204 provides clock 56 as the UCLKN clock 205. Negative-going transitions in clock 203 represent positive-going transitions in clock 56 and negative-going transitions in clock 205 represent negative-going transitions in clock 56. Clocks 203 and 205 present, therefore, negative-going transitions alternating in time. Each negative-going transition in clocks 203 and 205 represents presentation of stable SCI symbol 50 data on the data bus 106.

Thus, UCLKP clock 203 clocks symbols 50 associated with a positive rising edge in the symbol separator clock while UCLKN clock 205 clocks symbols 50 associated with the negative going transitions in the signal separator clock. Clocks 203 and 205 are complimentary and operate 180 degrees out-of-phase relative to one another. SCI protocol dictates that symbols 50 arrive at positive-going and negative-going transitions in the symbol separator clock. Negative-going transitions in clocks 203 and 205 alternate in time and represent potential sample points. A given symbol 50 is captured into an appropriate, i.e., enabled, one of register 212 responding to clocks 203 and 205.

Symbol registers 212, individually 212a–212f, each hold one SCI symbol 50 and the associated flag bit. Each of registers 212 couples at its input to data bus 106. In this manner, by selectively enabling and clocking registers 212, a selected one of registers 212 captures a given SCI symbol 50 from data bus 106. Only one of registers 212, however, is both clocked and enabled at any given time. Registers 212 are clocked by one of clocks 203 or 205. More particularly, clock 205 applies to symbol registers 212a, 212c, and 212e while clock 203 applies to symbol registers 212b, 212d, and 212f. Thus, registers 212a, 212c, and 212e are clocked concurrently by clock 205 while registers 212b, 212d, and 212f are clocked concurrently by clock 203.

A set of enable registers 206, individually 206a–206f, each apply its output to a corresponding enable input of registers 212a–212f. Enable registers 206a, 206c, and 206e are clocked by clock 203 and enable registers 206b, 206d, and 206f are clocked by clock 205. Each of registers 206 also applies its output to a successive one of registers 206. The final register, i.e., 206f, applies its output via block 201 as input to the first enable register, i.e., register 206a. By appropriately initializing registers 206 and clocking registers 206 as described with clocks 203 and 205, logic values cycle or loop through the enabling registers 206. In this manner, only one clocked register 212 receives at its enable input a logic value one, and therefore only one of registers 212 captures an SCI symbol 50 from data bus 106 at any given time.

Initialization of registers 206 occurs in response to an SCI synchronization packet arriving from the upstream link, i.e., arriving from node 12a. Upon initialization, block 201 feeds a logic zero value into the sequence of registers 206 until each of registers 206a–206e contain a logic zero value, then block 201 feeds a single logic one value into register 206a whereby all registers 206, except register 206a, contain a logic value zero. During operation, the logic values cycle or loop through the registers 206 to cyclically enable writing of symbols into alternating ones of symbol registers 212.

Figure 5B:
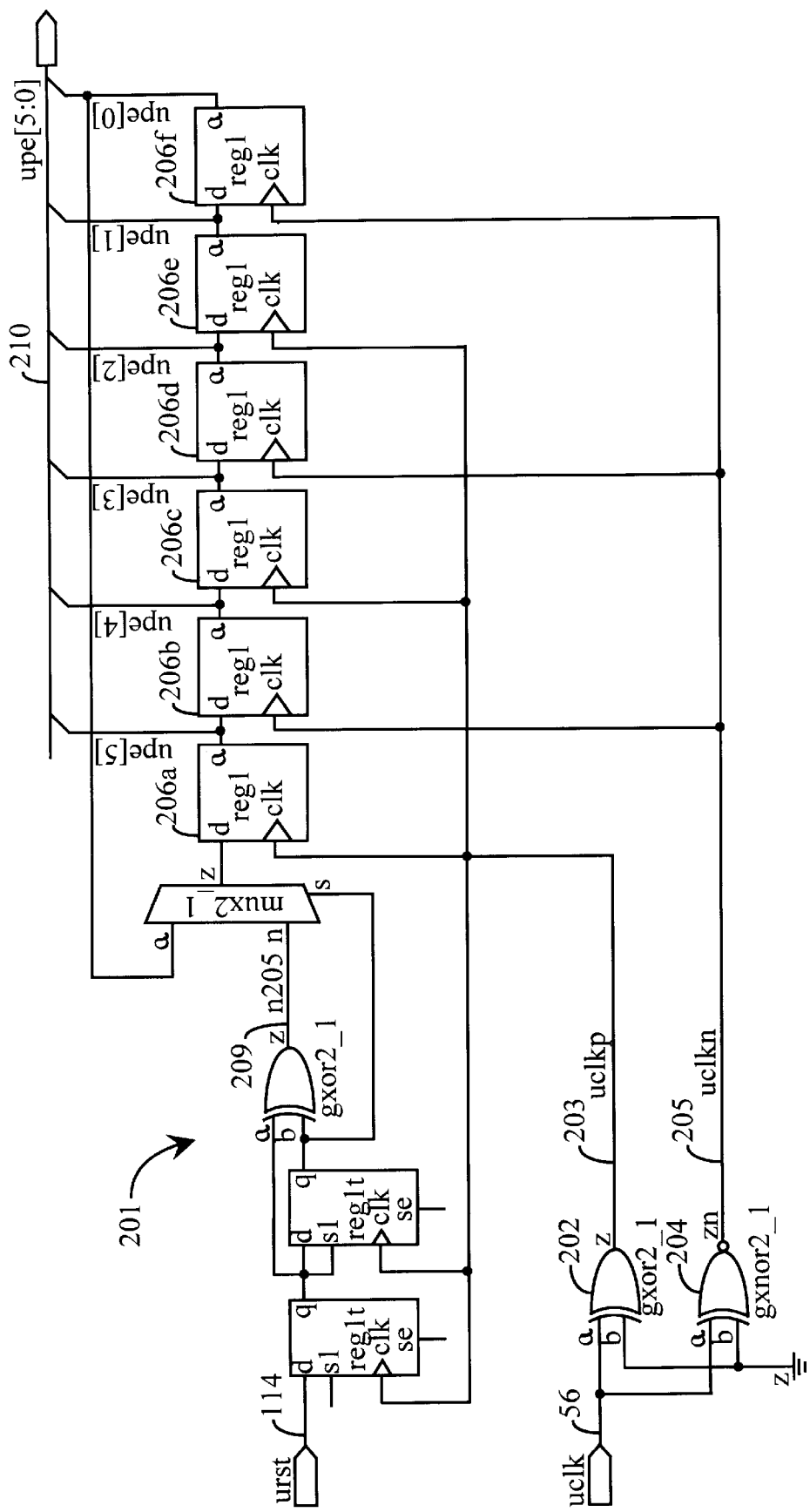

FIG. 5B further details block 201 and its relationship to registers 206. In FIG. 5B, clock 56 applies to buffers 202 and 204 to produce the clocks 203 and 205 with 180 degree phase relation. When the reset signal 114 is asserted, i.e., zero value to one value transition, a pulse is generated at block 205 output 209. This pulse in output 209 is forced into registers 206, initially into register 206a, resulting in a logic value one circulating counter-clockwise, in the view of FIG. 5B, on every rising edge of either clock 203 or clock 205. Output 210 of registers 206 is then used as enabling signals to registers 212a–212f as well as an input control value to the controller 230. An important characteristic of operation is the overlapping of a logic value one in adjacent registers 206 as exemplified in the following table indicating register 206 states at clocks 203 and 205 edge events:

| | |
|---|---|
| Clock_203_edge (i): | 0 0 1 1 0 0 |
| Clock_205_edge (i): | 0 0 0 1 1 0 |
| Clock_203_edge (i + 1): | 0 0 0 0 1 1 |
| Clock_205_edge (i + 1): | 1 0 0 0 0 1 |
| Clock_203_edge (i + 2): | 1 1 0 0 0 0 |
| Clock_205_edge (i + 2): | 0 1 1 0 0 0 |
| Clock_203_edge (i + 3): | 0 0 1 1 0 0 |
| Clock_205_edge (i + 3): | 0 0 0 1 1 0 |

Hence, at any given time two adjacent ones of registers 206 will be actually set to a logic value one. One of the two associated registers 212, however, will not be clocked during this time. Generally, and with reference to what is known in the art as the Shannon Principle, this guarantees twice the bandwidth of the sampling device relative to the data-providing device.

In operation, an incoming stream of SCI symbols 50 are successively written into registers 212 in cyclic fashion. More particularly, following initialization a first symbol 50 is written into register 212a, a second symbol 50 written into register 212b, a third into register 212c, a fourth into register 212d, a fifth into register 212e, and a sixth into register 212f. The cyclic writing continues in this fashion, i.e., by next overwriting the content of register 212a with the seventh symbol 50. Cyclic writing of the sequence of incoming symbols 50 continues thereby making available the incoming symbols 50 by appropriately reading registers 212 in similar but offset cyclic fashion.

Returning to FIG. 5A, each of registers 212 applies its output to a corresponding input of a multiplexor 214.

Multiplexor 214 provides its output 216, i.e., a symbol 50 taken from one of registers 212, to a buffer 220. Buffer 220 provides its output 224 as a symbol 50. Thus, additional circuitry of node 12b collects a sequence of symbols 50 at the buffer 220, i.e., reads output 224. Important to note, collection of symbols 50 at output 224 occurs within the local clock domain of node 12b, i.e., with reference to local clock 36.

Cyclic reading of symbols 50 from registers 212 occurs by manipulation of a select input 218 to multiplexor 214. Select input 218 is provided by a controller 230. The principal responsibility of controller 230 is to select which of registers 212 will be read at any time. Cyclic reading of symbols 50 from registers 212 occurs by incrementing select signal 218 applied to multiplexor 214. Controller 230 monitors the current state of registers 206 by means of input 210 to guarantee that controller 230 never reads a register 212 currently capturing data from bus 106. Controller 230 receives the current state of enable registers 206 as its input 210. Reference to input 210 provides to controller 230 indication of a write position in the registers 212, i.e., indicates which of registers 212 is enabled to capture a symbol 50 from data bus 106. Controller 230 thereby references its input 210 to read in cyclic fashion the content of a register 212 having recently captured a symbol 50.

Controller 230 collects symbols 50 from registers 212 approximately one clock cycle behind writing or capturing of symbols 50 by registers 212. If controller 230 finds that cyclic reading occurs at slightly greater rate than cyclic writing of registers 212, a symbol 50 is occasionally inserted by maintaining the select input 218 at a given value for two successive read operations. Similarly, if controller 230 detects that cyclic reading of symbols 50 occurs slightly faster than cyclic writing of symbols 50, then controller 230 occasionally skips a symbol 50 by twice incrementing select input 218.

When writing and reading in coordinated circular fashion as described herein, due to the physical effects of the crystals 30 and 34 and associated oscillators 32 and 36, respectively, clock domains in nodes 12a and 12b may not be equal and may drift relatively over time. Accordingly, occasionally it is necessary to either insert an extra symbol 50 or delete an extra symbol 50. This avoids conflict between reading and writing of registers 212. Such insertion and deletion, however, occurs only during a synchronization packet. More particularly, a synchronization packet can be increased by one symbol or decreased by one symbol. In a nominal case, a synchronization packet includes eight symbols 50 as transmitted from an upstream node, i.e., as transmitted by node 12a. If necessary, controller 230 adds an extra synchronization symbol 50 by maintaining select signal 218 constant for two clock cycles. Similarly, controller 230 deletes a synchronization symbol 50 by incrementing select signal 218 twice in a given clock cycle. Thus, the resulting synchronization packet as presented to node 12b by the circuitry illustrated in FIGS. 5A and 5B contains seven symbols 50 when a symbol has been deleted and nine symbols 50 when a symbol 50 has been inserted.

Accordingly, controller 230 takes as inputs signal 210 representing the current state of enable registers 206, reset signal 114 generated in the upstream domain, the local clock 236, and local reset 104. The principle output of controller 230 is the select signal 218. The select signal 218 is based on an analysis of the enable register 206 content, i.e., analysis of signal 210, after the reset signal 114 has been asserted and the de-skew circuit 100 has completed its function. Select value 218 is set such that there is no conflict between writing and reading of any one of registers 212a–212f when the content of a selected one of registers 212 is loaded into the output register 220, i.e., the select signal 218 is asserted at a time when no reading from or writing to registers 212 is immediately pending or under execution. Output 237 of controller 230 is asserted whenever an error situation occurs, i.e., loss of upstream connection or absence of incoming synchronization packets. Signal 238 and signal 239 are generally identical signals, one being delayed in time to signal that the output 224 from buffer 220 is valid and may be interpreted by succeeding circuitry of the local node, i.e., in this case succeeding circuitry of node 12b.

Thus, SCI node 12a writes into registers 212 with reference to its local clock 32 domain while SCI node 12b reads from registers 212 with reference to its local clock 36 domain. Such reading and writing occurs, however, in such fashion that node 12b never reads a location being written to by node 12a. Generally, node 12b guarantees at least one full clock 56 cycle between writing of a given register 212 and reading therefrom.

It will be appreciated that the present invention is not restricted to the particular embodiment that has been described and illustrated, and that variations may be made therein without departing from the scope of the invention as found in the appended claims and equivalents thereof.

What is claimed is:

1. In a system generating at a first device a signal in reference to a first clock domain, said signal including a data portion and a clock portion, a method of reading said signal at a second device, said second device referencing a second clock domain, the method comprising the steps:

receiving said signal at said second device;

delaying at said second device said clock portion of said signal as a function of stability in said data portion to produce a delayed clock;

clocking with reference to said delayed clock alternately first and second sets of a plurality of data registers, said plurality of data registers comprising an ordered sequence, members of said first and second register sets alternating through said sequence;

enabling selectively two adjacent ones of said plurality registers according to said ordered sequence;

capturing at a given one of said registers said data portion of said signal, said given one of said registers being a register being concurrently clocked and enabled in said enabling and said clocking steps, respectively; and reading a data portion captured at one of said registers following said enabling step applied thereto.

2. A system according to claim 1 wherein said system complies with a salable coherent interface standard.

3. A system according to claim 1 wherein said first and second clock domains correspond to first and second high precision clock signals, said first clock signal being local to said first device and said second clock signal being local to said second device.

4. A system according to claim 1 wherein said clocking step comprises the steps:

applying said delayed clock to first and second buffers, one of said first and second buffers being an inverting buffer, to generate corresponding first and second register clock signals; and applying said first register clock signal to said first register set and said second register clock signal to said second register set.

5. A system according to claim 1 wherein said reading step comprises reading from a selected one of said registers said data portion following removal of said enable signal applied thereto.

6. In a system generating at a first device a signal in reference to a first clock domain, said signal including a data portion and a clock portion, a method of reading said signal at a second device, said second device referencing a second clock domain, the method comprising the steps:

receiving said signal at said second device;

delaying at said second device said clock portion as a function of stability in said data portion to produce a delayed clock, said delaying step including the steps of monitoring said data portion for occurrence of a synchronizing condition, calculating a delay in said clock portion corresponding to delayed stability in said synchronizing condition, and delaying said clock portion by said calculated delay to establish said delayed clock signal;

clocking with reference to said delayed clock alternately first and second sets of a plurality of data registers, said plurality of data registers comprising an ordered sequence, members of said first and second register sets alternating through said sequence;

enabling selectively two adjacent ones of said plurality registers;

capturing at a given one of said registers said data portion of said signal, said given one of said registers being a register being concurrently clocked and enabled in said enabling and said clocking steps, respectively; and reading a data portion captured at one of said registers following said enabling step applied thereto.

7. A system according to claim 6 wherein said calculating step comprises the steps:

passing said clock portion along a sequence of delay elements with each element providing output to a next successive one of said delay elements, to a corresponding input of a multiplexor, and to a corresponding capture element;

capturing the content of said delay elements in the corresponding capture elements concurrent with detected stabilization said synchronizing condition; and locating a position within said sequence of delay elements of transition in said clock portion following said capturing step by reference to said capture elements.

8. A system according to claim 7 wherein said delaying step comprises the steps:

applying a select signal to said multiplexor element as a function of said located position; and taking said delayed clock from an output of said multiplexor element.

9. A device receiving a signal, said signal including a data portion and a clock portion, the device comprising:

a clock receiving buffer coupled to the clock portion of said signal;

a data receiving buffer coupled to the data portion of said signal;

a delay element coupled to said clock receiving buffer an generating a delayed clock, said delayed clock being delayed relative to said clock portion;

a clocking element receiving said delayed clock and producing as a function thereof first and second register clock signals, said first and second register clock signals being mutually complimentary;

a plurality of data registers organized as an ordered sequence, members of first and second register sets alternating through said sequence, said first register set receiving said first register clock signal, said second register set receiving said second register clock signal; and an enable element coupled to an enable input of each of said registers and selectively enabling at least one of said registers whereby a selected one of said registers is concurrently clocked by said clocking element and enabled by said enable element and in response thereto collects said data portion of said signal.

10. A device according to claim 9 wherein said delayed clock signal is delayed relative to said clock portion as a function of detected stability in a designated portion of said data portion.

11. A device according to claim 10 wherein said designated portion of said data portion is a synchronization symbol under a scaled coherent interface standard.

12. A device according to claim 9 wherein said enable element enables a sequentially adjacent two of said registers.

13. A device according to claim 9 wherein said delay element comprises:

a sequence of delay sub-elements receiving at a first one thereof said clock portion and at each successive one the output of a previous one;

a multiplexor receiving at each input thereof an output of one of said delay sub-elements and including a select input dictating which of said inputs are passed to an output of said multiplexor, said multiplexor output providing said delayed clock;

a capture buffer storing the outputs of said delay sub-elements in response to a crest signal;

a synchronizing element producing said crest signal as a function of detected stability in a designated portion of said data portion; and a calculation element responsive to said crest signal by referencing said capture buffer to determine a location of a transition of said clock portion within said sequence of delay sub-elements and applying a corresponding select signal to the select input of said multiplexor.

14. A device reading a signal, the signal including a data portion and a clock portion, the device comprising:

a data bus carrying said data portion;

a plurality of registers each including a data input coupled to said data bus, a clock input, and an enable input, said plurality of registers being organized in an ordered sequence, each of said registers capturing said data portion in response to concurrent assertion of its clock and enable inputs;

first and second clock signals mutually complimentary and applied alternately through said ordered sequence whereby two adjacent ones of said plurality of registers receive each one of said first and second clock signals;

an enable signal applied selectively to two adjacent ones of said plurality of registers according to said ordered sequence at said enable inputs thereof; and a read control monitoring said enable signal and reading from a read select one of said registers said data portion following capture thereof.

* * * * *